US009800475B2

(12) United States Patent
Chan et al.

(10) Patent No.: US 9,800,475 B2
(45) Date of Patent: *Oct. 24, 2017

(54) MESSAGE ORIENTED CONSTRUCTION OF WEB SERVICES

(71) Applicant: International Business Machines Corporation, Armonk, NY (US)

(72) Inventors: Allen V. C. Chan, Markham (CA); Zhongming Chen, Scarborough (CA); Phil S. Coulthard, Auroro (CA); Richard M. Goldberg, Thornhill (CA); Elaine Y. L. Lau, Markham (CA); Chee W. Ooi, Markham (CA); David A. Spriet, Sharon (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 698 days.

This patent is subject to a terminal disclaimer.

(21) Appl. No.: 14/071,083

(22) Filed: Nov. 4, 2013

(65) Prior Publication Data

US 2014/0059441 A1 Feb. 27, 2014

Related U.S. Application Data

(63) Continuation of application No. 11/559,981, filed on Nov. 15, 2006, now Pat. No. 8,621,041.

(30) Foreign Application Priority Data

Nov. 18, 2005 (CA) ...................................... 2527447

(51) Int. Cl.
*H04L 29/08* (2006.01)
*H04L 12/24* (2006.01)
(Continued)

(52) U.S. Cl.
CPC ................ *H04L 41/50* (2013.01); *G06F 8/24* (2013.01); *G06F 8/34* (2013.01); *G06F 8/51* (2013.01);
(Continued)

(58) Field of Classification Search
CPC .... G06F 21/10; G06F 2221/0788; G06F 8/51; G06Q 2220/10; G06Q 40/02; H04L 2463/102; H04L 67/104; H04L 67/34
See application file for complete search history.

(56) References Cited

U.S. PATENT DOCUMENTS 7,062,718 B2 6/2006 Kodosky et al.
7,555,538 B2 6/2009 Shenfield et al.
(Continued)

FOREIGN PATENT DOCUMENTS

KR 1020010103914 A 11/2001
KR 1020050091030 A 9/2005

OTHER PUBLICATIONS

Canadian Intellectual Property Office, Office Action for Application No. 2,527,447, Jul. 3 2013, pp. 1-3, Canada.
(Continued)

*Primary Examiner* — Barbara B Anyan
(74) *Attorney, Agent, or Firm* — Lee Law, PLLC; Christopher B. Lee

(57) ABSTRACT

A selection of graphical message flow primitives defined within the message flow builder that each graphically represent and define message-oriented logic of an operation for the Web service are graphically assembled. Each graphical message flow primitive is defined within the message flow builder as a representation of a unit of work usable to define message flow patterns of Web service operation flow types and each includes a Web service operational processing logic definition of the representation of the respective unit of (Continued)

work usable to generate executable Web service logic. Selected ones of the graphical message flow primitives are graphically interconnected to represent a flow of messages to create a message-oriented Web service definition. The executable Web service logic defined within the message flow builder by each one of the interconnected selected graphical message flow primitives within the created message-oriented Web service definition is generated to construct the Web service.

20 Claims, 5 Drawing Sheets

(51) Int. Cl.
  *G06F 9/45* (2006.01)
  *G06F 21/10* (2013.01)
  *G06F 9/50* (2006.01)
  *G06F 9/44* (2006.01)

(52) U.S. Cl.
  CPC .............. *G06F 9/505* (2013.01); *G06F 21/10* (2013.01); *H04L 67/02* (2013.01); *H04L 67/104* (2013.01)

(56) References Cited

U.S. PATENT DOCUMENTS

| | | | |
|---|---|---|---|
| 8,489,742 B2* | 7/2013 | Clubb | G06F 9/505 709/223 |
| 2002/0147823 A1 | 10/2002 | Healy | |
| 2004/0088347 A1* | 5/2004 | Yeager | H04L 67/104 709/202 |
| 2004/0260820 A1 | 12/2004 | Bearman | |
| 2005/0027871 A1* | 2/2005 | Bradley | G06F 21/10 709/227 |
| 2005/0120353 A1 | 6/2005 | Zhang et al. | |
| 2005/0256882 A1 | 11/2005 | Able et al. | |
| 2006/0206599 A1 | 9/2006 | Milligan et al. | |
| 2006/0234763 A1 | 10/2006 | Debruin et al. | |
| 2006/0271644 A1 | 11/2006 | Yamaizumi et al. | |
| 2010/0269098 A1* | 10/2010 | DeBruin | G06F 8/51 717/114 |

OTHER PUBLICATIONS

United States Patent and Trademark Office, Office Action for U.S. Appl. No. 11/559,981, Jun. 22, 2010, pp. 1-12, Alexandria, VA, USA.

United States Patent and Trademark Office, Office Action for U.S. Appl. No. 11/559,981, Nov. 24, 2010, pp. 1-11, Alexandria, VA, USA.

United States Patent and Trademark Office, Office Action for U.S. Appl. No. 11/559,981, Apr. 27, 2011, pp. 1-11, Alexandria, VA, USA.

United States Patent and Trademark Office, Office Action for U.S. Appl. No. 11/559,981, Oct. 14, 2011, pp. 1-12, Alexandria, VA, USA.

United States Patent and Trademark Office, Office Action for U.S. Appl. No. 11/559,981, May 22, 2012, pp. 1-12, Alexandria, VA, USA.

United States Patent and Trademark Office, Office Action for U.S. Appl. No. 11/559,981, Nov. 13, 2012, pp. 1-13, Alexandria, VA, USA.

United States Patent and Trademark Office, Office Action for U.S. Appl. No. 11/559,981, May 21, 2013, pp. 1-14, Alexandria, VA, USA.

United States Patent and Trademark Office, Notice of Allowance for U.S. Appl. No. 11/559,981, Aug. 8, 2013, pp. 1-21, Alexandria, VA, USA.

Arturo Crespo, et al., WebWriter: A Browser-based editor for Constructing Web Applications, 1996, pp. 1291-1306, Computer Networks and ISDN Systems, pp. 1291-1306, vol. 28, Elsevier Science B.V.

* cited by examiner

Input Request Flow
610

Solicit Response Flow
620

Notification/Solicit Request Flow
630

Call Out Response Flow
640

| Originator operation type | Partner operation type | Input Request Flow | CallOut Response Flow | Notification/ Solicit Request Flow | Solicit Response Flow |
|---|---|---|---|---|---|
| One-way | N/A | Yes | No | No | No |
| One-way | One-way | Yes | No | No | No |
| One-way | Request-response | Yes | Yes | No | No |
| One-way | Solicit-response | Yes | No | No | Yes |
| One-way | Notification | Yes | No | No | No |
| Request-response | N/A | Yes | No | No | No |
| Request-response | One-way | Yes | No | No | No |
| Request-response | Request-response | Yes | Yes | No | No |
| Request-response | Solicit-response | Yes | Yes | No | Yes |
| Request-response | Notification | Yes | Yes | No | No |
| Solicit-response | N/A | No | No | Yes | Yes |
| Solicit-response | One-way | No | No | No | Yes |
| Solicit-response | Request-response | No | No | No | Yes |
| Solicit-response | Solicit-response | No | No | No | Yes |
| Solicit-response | Notification | No | No | No | Yes |
| Notification | N/A | No | No | Yes | No |
| Notification | One-way | No | No | No | No |
| Notification | Request-response | No | No | No | No |
| Notification | Solicit-response | No | No | No | No |
| Notification | Notification | No | No | No | No |

FIG. 7

MESSAGE ORIENTED CONSTRUCTION OF WEB SERVICES

RELATED APPLICATIONS

This application claims priority to and claims the benefit of Canadian Patent Application Serial No. 2,527,447 titled "MESSAGE ORIENTED CONSTRUCTION OF WEB SERVICES," which was filed in the Canadian Intellectual Property Office on Nov. 18, 2005, and which is incorporated herein by reference in its entirety; and this application is a continuation of and claims priority to and claims the benefit of U.S. patent application Ser. No. 11/559,981 titled "MESSAGE ORIENTED CONSTRUCTION OF WEB SERVICES," which was filed in the United States Patent and Trademark Office on Nov. 15, 2006, which has a current status of "Allowed," and which is incorporated herein by reference in its entirety.

BACKGROUND

The present invention relates to the field of Web services in distributed computing, and more particularly to the message oriented integration of Web services.

Web services represent the leading edge of distributed computing and are viewed as the foundation for developing a truly universal model for supporting the rapid development of component based applications over the World Wide Web. Web services are known in the art to include a stack of emerging standards that describe a service oriented, component based application architecture. In particular, Web services are loosely-coupled, reusable software components that semantically encapsulate discrete functionality and are distributed and programmatically accessible over standard Internet protocols. Conceptually, Web services represent a model in which discrete tasks within processes are distributed widely throughout a value net. Many industry experts consider the service oriented Web services initiative to be the next evolutionary phase of the Internet.

Typically, Web services are described by an interface such as the Web services definition language (WSDL), and can be implemented according to the interface, though the implementation details matter little so long as the implementation conforms to the Web services interface. For example, a Web Service can be described externally via a WSDL port type including of one or more operations. The operations include up to one input message, up to one output message, and zero or more fault messages. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

Referring to FIG. 1, a traditional Web services server 110 includes a servlet 140 disposed within a Web container 120 as a listener for a Web service request 160A from a Web services client 130 and to provide a response 160B to the Web services client 130. When the request 160A is received in the servlet 140, the message content of the request 160A, along with reflection logic, are used to create the target object of the message, and to select the correct method in an instance of business logic 150 on the object. Parameters to the method on the target object further are created using the encoded form of the message along with the methods of the reflection interface. Thus, the conventional Web services model tightly couples the client interface to the server implementation of the service.

The flow of control, once the message 160A has been delivered to the servlet 140 is as follows:

1. Message delivered to the servlet.
2. Servlet determines the name of the class to service the message.
3. Servlet creates an instance of the class.
4. Servlet determines the name of the method to invoke on the class.
5. Servlet creates the parameters to the method from information in the message.
6. Servlet invokes the method passing the parameters created from the message.
7. Method returns with results or fault.
8. Servlet encodes the results or fault similar to the parameters sent in the message.
9. Servlet responds with the response message.

In the typical circumstance, a Web service can be constructed using a low-level programming language such as the Java™ programming language, the C++ programming language or the Java 2 Enterprise Edition framework. (Java and all Java-based trademarks are trademarks of Sun Microsystems, Inc.) Notwithstanding, the use of a low-level programming language to construct a Web service requires of the developer a degree of proficiency in the underlying programming languages and an awareness of any restrictions imposed by the specific domain mapping rules.

By comparison, a Message Oriented Architecture (MOA) describes a system integration approach where applications can communicate with other applications through the exchange of messages without requiring knowledge of the platform or processor in which each other application resides. Rather, the messages can contain formatted data, requests for action, or both. The modern climate reflects an increasing need to integrate or mediate Web services which use different standards and protocols, and oftentimes demonstrate different operating behaviors. The integration and mediation of Web services can be particularly important in the domain of Enterprise Application Integration (EAI) and Enterprise Data Interchange (EDI), which traditionally use a MOA approach to integrate Web services. Yet, for users who are only familiar with message-based programming, construction of Web services through Java and J2EE requires a significant investment in skills training and domain knowledge transfer.

BRIEF SUMMARY

Embodiments of the present invention address deficiencies of the art in respect to Web services construction and provide a novel and non-obvious method, system and computer program product for message-oriented Web services construction. In a first embodiment of the invention, a method for the message oriented construction of a Web service can include graphically assembling a selection of message flow primitives defining an operation for a Web service, interconnecting selected ones of the message flow primitives to represent a flow of messages from one interconnected message flow primitive to another interconnected message flow primitive, and generating Web service logic from the selection of message flow primitives. The method further can include interpreting or executing the Web service logic in response to receiving a request to invoke the Web service.

In one aspect of the embodiment, graphically assembling a selection of message flow primitives defining an operation for a Web service can include determining a Web services operation type for the Web service, matching the Web services operation type to a pre-configured message flow pattern, and rendering a visual representation of the message flow pattern. In another aspect of the embodiment, an additional flow primitive can be inserted in the message flow pattern and the inserted additional flow primitive can be connected to at least one other flow primitive in the message flow pattern. In yet another aspect of the embodiment, determining a Web services operation type for the Web service can include reading a registry of Web services to identify Web services as defined by a corresponding WSDL document, identifying Web services operations for each of the Web services in the registry, and determining a Web services operation type for a selected one of the identified Web services operations.

In a second embodiment of the invention, a data processing system configured for message oriented Web services construction can include message flow patterns, each message flow pattern including a selection of message flow primitives, a graphical user interface (GUI) message flow builder coupled to the message flow patterns and a registry of Web services, and code generation logic coupled to the GUI message flow builder. The GUI message flow builder can include program code enabled to generate flow logic from an assembly of message flow primitives in a message flow pattern matched to a Web services operation type for a Web services operation selected in a Web service listed in the registry Likewise, the code generation logic can include program code enabled to transform the message flow logic into Web services logic for use by a run-time for a Web services server Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION

Embodiments of the present invention provide a method, system and computer program product for the message-oriented construction of Web services. In accordance with an embodiment of the present invention, an operation for a Web service can be defined through a message oriented arrangement of graphical elements in a graphical user interface. The graphical elements, referred to as message flow primitives, can specify either the receipt or transmission of a message and corresponding processing to be performed subsequent to the receipt of a message, prior to the transmission of a message or both. Each message flow primitive further can provide for a fault message to be provided to a fault handler.

Importantly, a message flow pattern can be formed from a selection of interconnected message flow primitives to match the Web services operation type of the selected operation. As it is well-known in the art, Web services operation types include one-way, request-response, solicit-response and notification operations. Other Web services operation types also are contemplated to fall within the scope of the invention including those defined by the WSDL 2.0 specification. Additionally, intermediate processing can be specified for the message flow pattern by inserting a user defined activity primitive into the message flow pattern. Finally, different flow patterns can be combined to provide a uniform approach to handle both synchronous and asynchronous message based protocols. Specifically, a flow pattern can be coupled to a message queue through a message primitive corresponding to one-way type Web services operation type in order to provide access to different types of message-oriented systems.

Notably, a Web service defined by the message flow pattern can include a message flow primitive to call out another Web service. In this way, Web services can be composed from other Web services. Finally, the message flow pattern can be processed by a code generator to produce code enabled for use in a run-time environment for a Web services server. In this way, a Web service can be constructed graphically according to a messaging paradigm and can be deployed into a Web service environment. Thus, one familiar with message based programming can more readily construct a Web service without having a full command of procedural programming.

Figure 1:
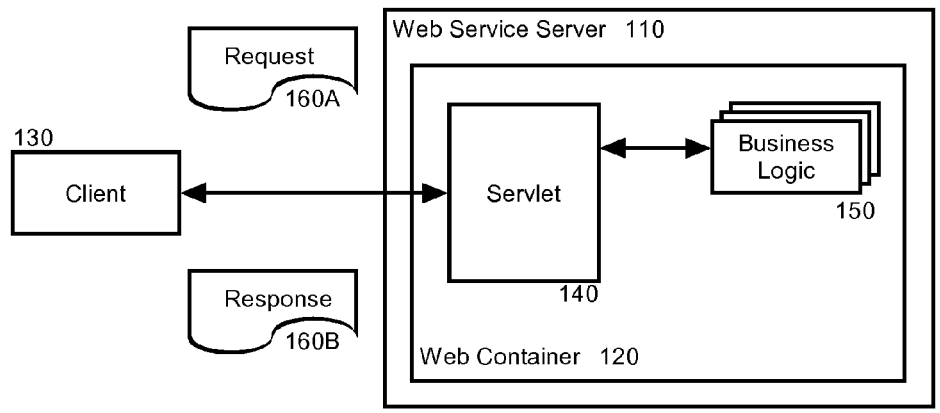
FIG. 1 is a block diagram illustrating traditional Web services deployment and delivery architecture known in the art.
Figure 2:
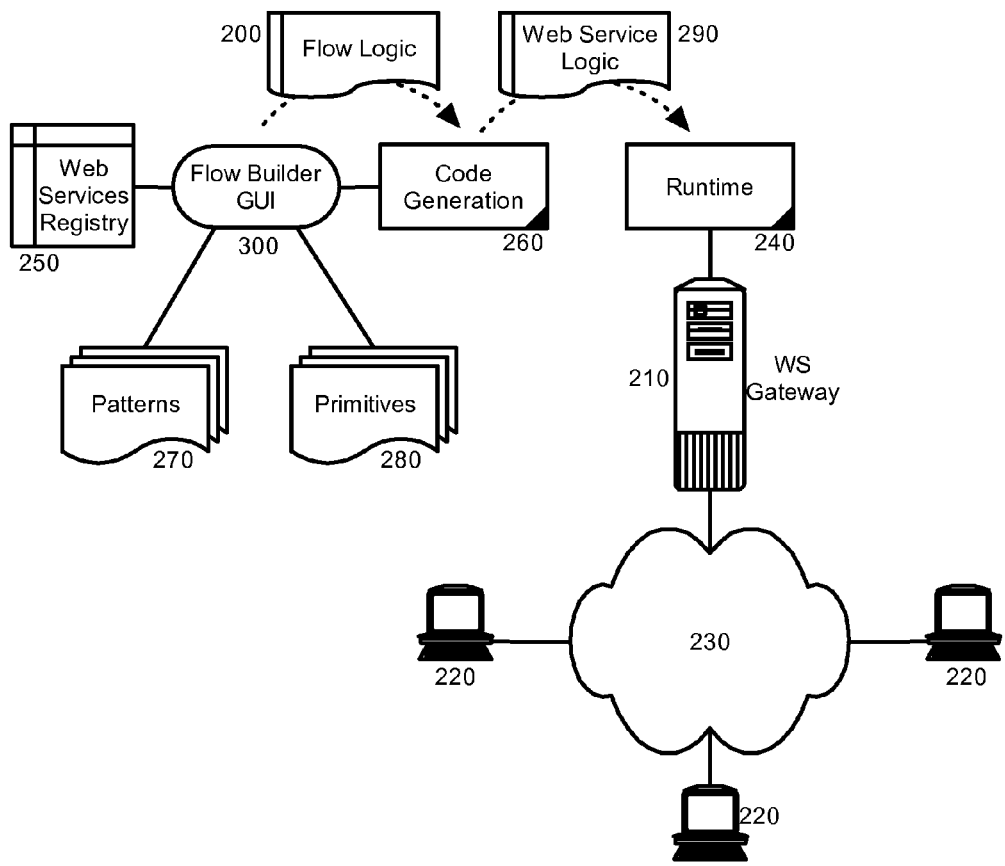
FIG. 2 is a schematic illustration of a Web services deployment and delivery architecture configured for message-oriented construction in accordance with the present invention.

In more particular illustration, FIG. 2 is a schematic illustration of a Web services deployment and delivery data processing system configured for message-oriented construction in accordance with the present invention. As shown in FIG. 2, the data processing system can include a flow builder graphical user interface (GUI) 300 coupled to code generation logic 260. The flow builder GUI 300 can access each of one or more flow patterns 270 and one or more flow primitives 280 in the course of constructing flow logic 200 for a selected Web service operation for a Web service in the Web services registry 250.

Figure 4:
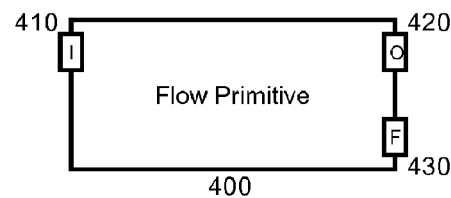
FIG. 4 is a pictorial illustration of a flow primitive for use in a user interface to the Web services deployment and delivery architecture of FIG. 2.

The flow primitives 280 can represent a unit of work that must be completed before executing the next flow primitive. Specifically, each flow primitive 280 can receive and process, formulate and process, or formulate and transmit a message. For example, each flow primitive 280 can act upon or change the content or context of a message. To that end, as shown in FIG. 4, a flow primitive 400 can include zero or more input terminals 410 in which a message can be received, and zero or more output terminals 420 through which a message can be transmitted to another, coupled flow primitive. Optionally, a flow primitive 400 further can include a terminal for fault handling 430 over which fault messages can be transmitted to a coupled fault handler.

The terminals 410, 420 of the flow primitive 400 can be typed by a WSDL message. As such, the messages must be compatible in order to permit the connection of an output terminal 420 of the flow primitives 400 to the input terminal 410 of another primitive 400. Yet, there is no requirement that the message type of an output message from an output terminal 420 match that of an input terminal 410 in another primitive 400. Rather, transformation logic can included within a specific type of flow primitive 400 to transform a message type from one format to another to establish compatibility between messages transmitted between flow primitives 400.

Flow primitives 400 can be categorized as Web service operation flow primitives and as user-defined flow primitives. Web service operation flow primitives define the operational behavior of a Web service operation. The following table defines a selection of exemplary Web services operation flow primitives:

| Flow Primitive | Represents | Flows |
| --- | --- | --- |
| Input | An input request | Input Request |
| InputResponse | A return response | Input Request, CallOut Response |
| Solicit | Sending of a solicit request | Input Request, Solicit Request CallOut Response |
| SolicitResponse | A response from the solicit request | Solicit Response |
| Notification | Sending of a notification | Input Request CallOut Response |
| CallOut | Calling a Partner Web Service | Input Request |
| CallOutResponse | A response from the call to the Partner Web Service | CallOut Response |
| InputFault | Return of a fault message | Input Request CallOut Response |
| CallOutFault | Receipt of a fault message | CallOut Response |

By comparison, a user-defined flow primitive can be user-defined to perform stand-alone operations, such as message logging, binary decision switching, content transformation. In addition, the user defined flow primitive can host a Java programming logic or XQuery logic operation operating on an input message.

Figure 6A:
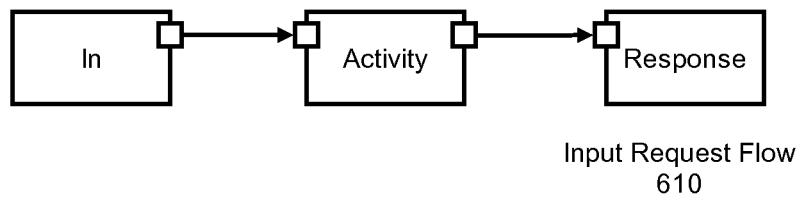
FIGS. 6A through 6D, taken together, are screen shots of different flow patterns defining message-oriented logic for Web service operations in the user interface of FIG. 5; and, FIG. 7 is a table correlating different Web services operation types with different ones of the flow patterns of FIGS. 6A through 6D in the construction of a Web service in the user interface of FIG. 5.

Different flow primitives can be arranged into a flow pattern which can be matched to a specific Web services operation type. In more particular illustration, FIGS. 6A through 6D, taken together, are screen shots of different flow patterns defining message-oriented logic for Web service operations. Referring first to FIG. 6A, an input request flow pattern 610 is shown. An input request flow pattern 610 can include an input primitive combined with one or more user-defined activity primitives followed by either an input response primitive or a call out primitive which can invoke other Web services operations for other Web services.

Figure 6B:
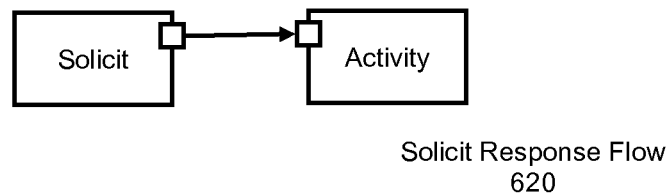
Figure 6C:
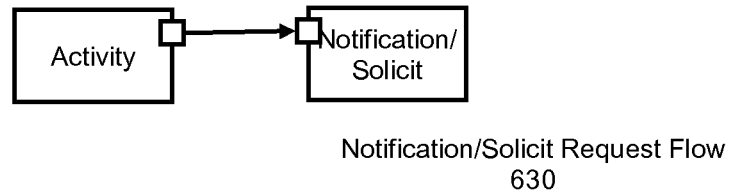
Figure 6D:
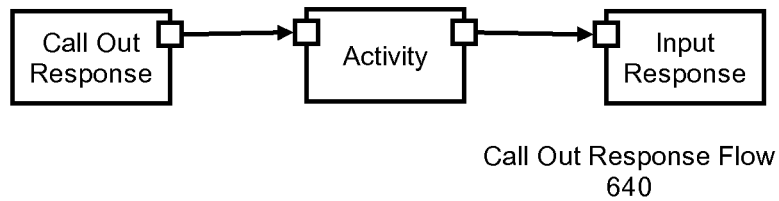

By comparison, referring to FIG. 6B, a solicit response flow pattern 620 can include a solicit primitive followed by one or more user-defined activity primitives. Referring to FIG. 6C, a notification/solicit request flow pattern 630 can include a user-activity defined primitive followed by either a notification primitive or a solicit primitive. Finally, referring to FIG. 6D, a call out response flow pattern 640 can include a call out response primitive coupled to one or more user-defined activity primitives followed by an input response primitive.

Returning to FIG. 2, in operation, a selection of Web services and corresponding operations defined by respective WSDL documents for the Web services can be provided through the flow builder GUI 300. An operation can be selected for a Web service and the operation type of the operation can be determined. To facilitate the matching of the selected operation to a flow pattern 270, a table can be accessed by the flow builder GUI 300 to correlate a selected operation to a corresponding flow pattern 270. For instance, FIG. 7 is a table illustrating the correlation of different Web services operation types with different ones of the flow patterns of FIGS. 6A through 6D in the construction of a Web service.

Based upon the determined operation type, a flow pattern 270 can be selected for the operation and the selected flow pattern 270 can be rendered in the flow builder GUI 300 according to the primitives 280 defined for the selected flow pattern 270. Additional primitives 280 such as user-defined activities can be inserted into the selected flow pattern 270 as can additional primitive-to-primitive connections between primitives 280 in the selected flow pattern 270. In illustration of the arrangement of primitives in the flow builder GUI 300, FIG. 5 is a screen shot of a user interface to the Web services deployment and delivery architecture of FIG. 2.

Figure 5:
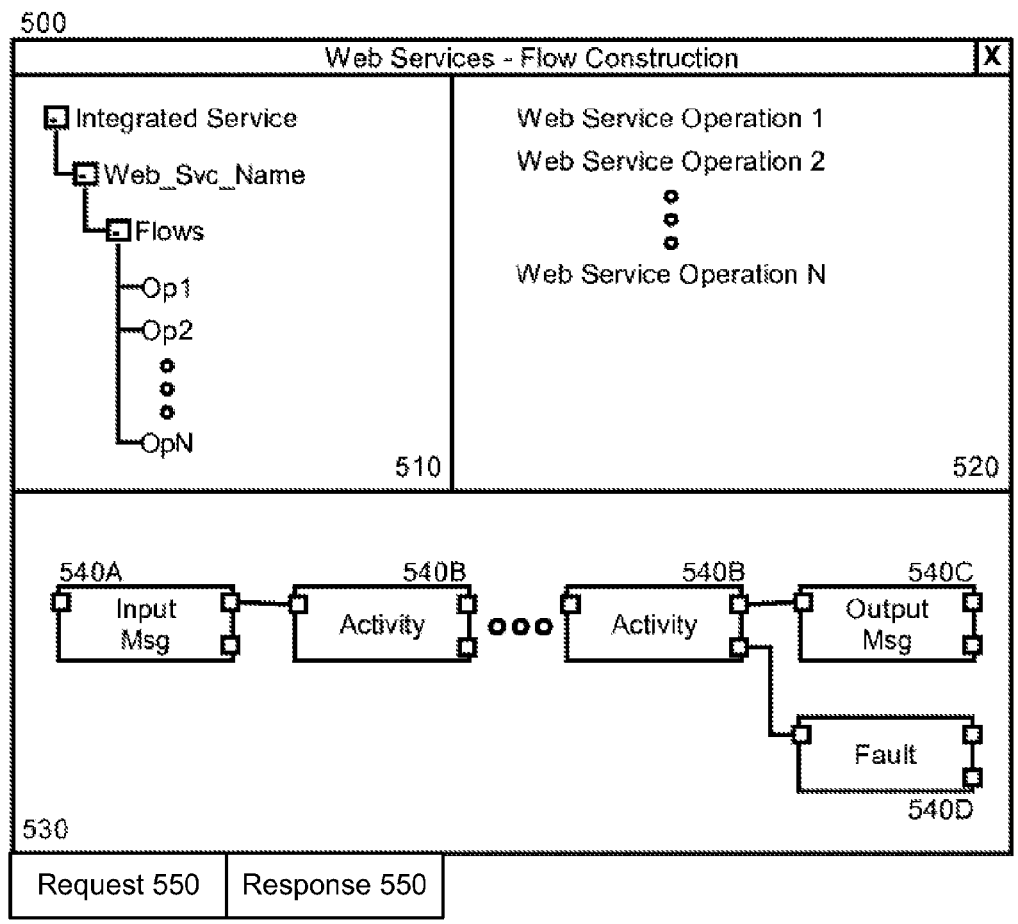
FIG. 5 is a screen shot of a user interface to the Web services deployment and delivery architecture of FIG. 2.

As shown in FIG. 5, a flow builder GUI 500 can include a Web service construction project window 510, a listing window 520 of Web services operations identified within Web services in a registry, and a flow builder window 530. The Web services construction project window 510 can provide a hierarchical view of the components of a Web services construction project, including defined message flow logic for one or more operations of the Web service under construction. The listing window 520, in turn, can provide a listing of Web services operations available for definition as located in a coupled registry of Web service WSDL documents. Finally, the flow builder window 530 can permit the placement and interconnection of flow patterns and flow primitives to define flow logic for a selected operation in the listing window 520.

Specifically, when an operation is selected in the listing window 520, the Web services operation type can be identified for the selected operation and a table can be consulted to identify a corresponding flow pattern. Subsequently, a graphical representation of the corresponding flow pattern can be rendered in the flow builder window. Generally, the flow patterns can include any of an input primitive 540A, one or more user-defined activity primitives 540B, or an output primitive 540C such as a response primitive, notification primitive, call out primitive, solicit primitive, or input response primitive. Different ones of the primitives can be coupled to one another indicating a flow of messages there between through graphical primitive-to-primitive connections coupled to the terminals of coupled primitives. More-over, different message flows can be assembled for a selected Web service operation and can be accessed through tabs 550.

Figure 3:
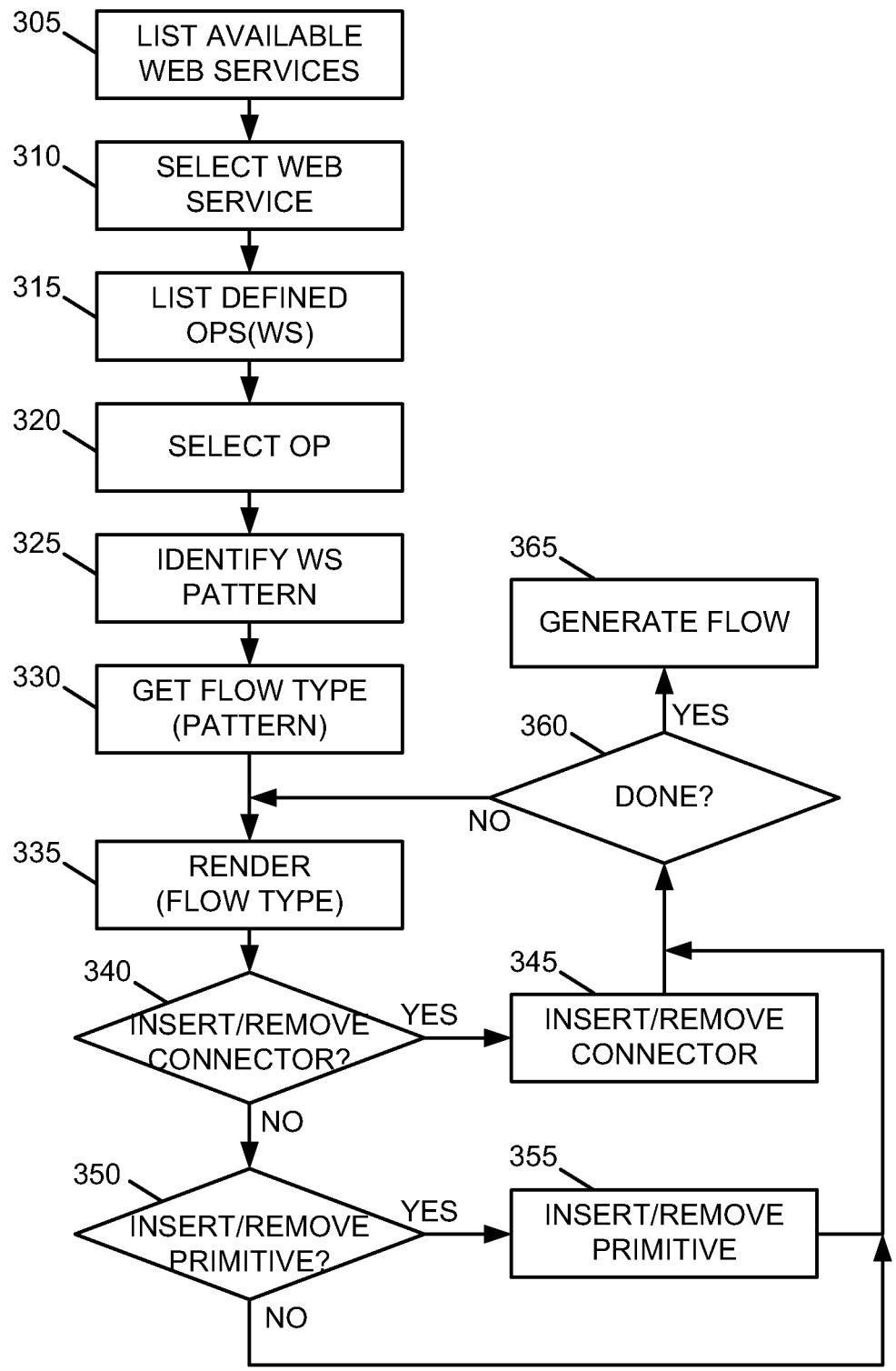
FIG. 3 is a flow chart illustrating a process for the message oriented construction of a Web service through the assembly of flow primitives in flow pattern in a user interface to the Web services deployment and delivery architecture of FIG. 2.

In further illustration of the operation of the flow builder GUI of FIG. 5, FIG. 3 is a flow chart illustrating a process for the message oriented construction of a Web service through the assembly of flow primitives in flow pattern in the flow builder window 530. Beginning in block 305, a listing of Web services can be provided by reference to a registry of Web services. In block 310, a Web service can be selected and in block 315, a listing of defined operations for the selected Web service can be provided. Subsequently, in block 320, a particular one of the operations for the selected Web service can be selected for construction.

In block 325, the operation type for the selected operation for the selected Web service can be determined and in block 330, the operation type can be matched to a particular flow pattern. In consequence, a graphical representation of the matched flow pattern can be rendered for use and modification by an end user in block 335. In decision block 340, it can be determined whether a connector between different primitives in the flow pattern is to be added or removed. If so, in block 345, the selected connector can be added or removed as the case may be. Likewise, in decision block 350, it can be determined whether a primitive is to be added or removed to the flow pattern. If so, in block 355, the primitive can be added or removed as the case may be. The process can continue in decision block 360 until no more modifications are to be made. Subsequently, the flow logic 365 can be generated for compilation into Web service logic for interpretation at run-time.

Finally returning to FIG. 2, generated flow logic 200 can be transformed by code generation logic 260 into Web service logic 290 interpretable by run-time 240. The run-time 240 can be coupled to a Web services server 210 configured to respond to Web service requests by requesting clients 220 over the computer communications network 230. In this regard, when a request for an operation in a Web service is received in the Web service server 210 from a requesting client 220, the run-time 240 can execute or interpret the logic defined by the Web service logic 290 in order to satisfy the received request. Any output produced by the Web service logic 290 can be provided to Web service server 210 for return to the requesting client 220.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for message-oriented construction of a Web service, the method comprising:
    receiving a message flow builder that comprises machine logic defining a plurality of graphical Web service message flow primitives, where each graphical Web service message flow primitive: (i) graphically represents and defines message processing logic of an operational Web service unit of work for the Web service, and (ii) is usable to generate executable Web service message processing logic defined within the message flow builder by the respective Web service message flow primitive;
    selecting a set of graphical Web service message flow primitives from the plurality of graphical Web service message flow primitives;
    graphically displaying an assembly, by a computing device, of the selected set of graphical Web service message flow primitives;
    in response to detection of user input selections, graphically displaying interconnections among the selected set of graphical Web service message flow primitives to represent a message processing flow of messages from one interconnected graphical Web service message flow primitive to another interconnected graphical Web service message flow primitive to create a message-oriented Web service definition; and
    generating the executable Web service message processing logic defined within the message flow builder by each one of the interconnected selected set of graphical Web service message flow primitives within the created message-oriented Web service definition to construct the Web service, where the message flow builder automates generation of the executable Web service message processing logic.

2. The method of claim 1, further comprising programmatically interpreting the executable Web service message processing logic in response to receiving a request to invoke the Web service.

3. The method of claim 1, further comprising programmatically executing the executable Web service message processing logic in response to receiving a request to invoke the Web service.

4. The method of claim 1, further comprising graphically displaying an interconnection, in response to detection of an additional user input selection, of at least one of the selected set of graphical Web service message flow primitives with a message queue through a graphical Web service message flow primitive corresponding to a one-way Web services operation type.

5. The method of claim 1, where graphically displaying the assembly, by the computing device, of the selected set of graphical Web service message flow primitives comprises:
    determining a Web services operation type for the Web service;
    matching the Web services operation type to a pre-configured message flow pattern; and
    rendering, according to the graphically assembled selected set of graphical Web service message flow primitives, a visual representation of the message flow pattern.

6. The method of claim 5, where determining the Web services operation type for the Web service comprises:
    reading a registry of Web services to identify a plurality of Web services as defined by a corresponding Web services definition language (WSDL) document;
    identifying a plurality of Web services operations for each of the Web services in the registry; and
    determining a Web services operation type for a selected one of the identified Web services operations, the Web services operation type comprising a Web services operation type selected from a group consisting of a one-way operation, a request-response operation, a solicit-response operation and a notification operation.

7. The method of claim 5, where matching the Web services operation type to the pre-configured message flow pattern comprises matching the Web services operation type to a message flow pattern selected from a group consisting of an input request flow pattern, a call out response flow pattern, a notification/solicit request flow pattern, and a solicit response flow pattern.

8. The method of claim 1, further comprising inserting, in response to detection of an additional user input selection, an additional graphical Web service message flow primitive in a message flow pattern and displaying at least one additional interconnection that connects the inserted additional graphical Web service message flow primitive to at least one other graphical Web service message flow primitive in the message flow pattern.

9. A data processing system configured for message-oriented construction of a Web service, the system comprising:
    a display; and
    a processor programmed to:
        receive a message flow builder that comprises machine logic defining a plurality of graphical Web service message flow primitives, where each graphical Web service message flow primitive: (i) graphically represents and defines message processing logic of an operational Web service unit of work for the Web service, and (ii) is usable to generate executable Web service message processing logic defined within the message flow builder by the respective Web service message flow primitive;
        select a set of graphical Web service message flow primitives from the plurality of graphical Web service message flow primitives;
        graphically display, on the display, an assembly of the selected set of graphical Web service message flow primitives;
        in response to detection of user input selections, graphically display, on the display, interconnections among the selected set of graphical Web service message flow primitives to represent a message processing flow of messages from one interconnected graphical Web service message flow primitive to another interconnected graphical Web service message flow primitive to create a message-oriented Web service definition; and
        generate the executable Web service message processing logic defined within the message flow builder by each one of the interconnected selected set of graphical Web service message flow primitives within the created message-oriented Web service definition to construct the Web service, where the message flow builder automates generation of the executable Web service message processing logic.

10. The data processing system of claim 9, where the processor is further programmed to programmatically interpret the executable Web service message processing logic in response to receiving a request to invoke the Web service.

11. The data processing system of claim 9, where, in being programmed to graphically display, on the display, the assembly of the selected set of graphical Web service message flow primitives, the processor is programmed to:
    determine a Web services operation type for the Web service;
    match the Web services operation type to a pre-configured message flow pattern; and
    render, according to the graphically assembled selected set of graphical Web service message flow primitives, a visual representation of the message flow pattern.

12. The data processing system of claim 11, where, in being programmed to determine the Web services operation type for the Web service, the processor is programmed to:
    read a registry of Web services to identify a plurality of Web services as defined by a corresponding Web services definition language (WSDL) document;
    identify a plurality of Web services operations for each of the Web services in the registry; and
    determine a Web services operation type for a selected one of the identified Web services operations, the Web services operation type comprising a Web services operation type selected from a group consisting of a one-way operation, a request-response operation, a solicit-response operation and a notification operation.

13. A computer program product for message-oriented construction of a Web service, comprising:
    a non-transitory computer readable storage medium having computer readable program code embodied therewith, where the computer readable program code when executed on a computer causes the computer to:
        receive a message flow builder that comprises machine logic defining a plurality of graphical Web service message flow primitives, where each graphical Web service message flow primitive: (i) graphically represents and defines message processing logic of an operational Web service unit of work for the Web service, and (ii) is usable to generate executable Web service message processing logic defined within the message flow builder by the respective Web service message flow primitive;
        select a set of graphical Web service message flow primitives from the plurality of graphical Web service message flow primitives;
        graphically display an assembly of the selected set of graphical Web service message flow primitives;
        in response to detection of user input selections, graphically display interconnections among the selected set of graphical Web service message flow primitives to represent a message processing flow of messages from one interconnected graphical Web service message flow primitive to another interconnected graphical Web service message flow primitive to create a message-oriented Web service definition; and generate the executable Web service message processing logic defined within the message flow builder by each one of the interconnected selected set of graphical Web service message flow primitives within the created message-oriented Web service definition to construct the Web service, where the message flow builder automates generation of the executable Web service message processing logic.

14. The computer program product of claim 13, where the computer readable program code when executed on the computer further causes the computer to programmatically interpret the executable Web service message processing logic in response to receiving a request to invoke the Web service.

15. The computer program product of claim 13, where the computer readable program code when executed on the computer further causes the computer to programmatically execute the executable Web service message processing logic in response to receiving a request to invoke the Web service.

16. The computer program product of claim 13, where the computer readable program code when executed on the computer further causes the computer to graphically displaying an interconnection, in response to detection of an additional user input selection, of at least one of the selected set of graphical Web service message flow primitives with a message queue through a graphical Web service message flow primitive corresponding to a one-way Web services operation type.

17. The computer program product of claim 13, where, in causing the computer to graphically display the assembly of the selected set of graphical Web service message flow primitives, the computer readable program code when executed on the computer causes the computer to:

determine a Web services operation type for the Web service;

match the Web services operation type to a pre-configured message flow pattern; and render, according to the graphically assembled selected set of graphical Web service message flow primitives, a visual representation of the message flow pattern.

18. The computer program product of claim 17, where, in causing the computer to determine the Web services operation type for the Web service, the computer readable program code when executed on the computer causes the computer to:

read a registry of Web services to identify a plurality of Web services as defined by a corresponding Web services definition language (WSDL) document;

identify a plurality of Web services operations for each of the Web services in the registry; and determine a Web services operation type for a selected one of the identified Web services operations, the Web services operation type comprising a Web services operation type selected from a group consisting of a one-way operation, a request-response operation, a solicit-response operation and a notification operation.

19. The computer program product of claim 17, where in causing the computer to match the Web services operation type to the pre-configured message flow pattern, the computer readable program code when executed on the computer causes the computer to match the Web services operation type to a message flow pattern selected from a group consisting of an input request flow pattern, a call out response flow pattern, a notification/solicit request flow pattern, and a solicit response flow pattern.

20. The computer program product of claim 13, where the computer readable program code when executed on the computer further causes the computer to insert, in response to detection of an additional user input selection, an additional graphical Web service message flow primitive in a message flow pattern and display at least one additional interconnection that connects the inserted additional graphical Web service message flow primitive to at least one other graphical Web service message flow primitive in the message flow pattern.

* * * * *